United States Patent [19]

Amery

[11] 3,969,759

[45] July 13, 1976

[54] DEFECT COMPENSATION SYSTEMS

[75] Inventor: John Gordon Amery, Indianapolis, Ind.

[73] Assignee: RCA Corporation, New York, N.Y.

[22] Filed: Apr. 21, 1975

[21] Appl. No.: 568,313

Related U.S. Application Data

[63] Continuation-in-part of Ser. No. 476,839, June 6, 1974, abandoned.

[52] U.S. Cl. .............................. 358/8; 178/6.6 DC; 358/31
[51] Int. Cl.² ..................... H04N 9/02; H04N 9/535
[58] Field of Search ....................... 358/4, 8, 31, 38; 178/DIG. 6, 6.6 R, 6.6 DC; 360/33, 38

[56] References Cited
UNITED STATES PATENTS

| | | | |
|---|---|---|---|
| 3,463,874 | 8/1969 | Hodge et al. | 358/8 |
| 3,586,762 | 6/1971 | Hodge et al. | 358/8 |
| 3,674,920 | 7/1972 | Rarudja | 358/31 |
| 3,679,814 | 7/1972 | Barclay | 358/8 |
| 3,824,620 | 7/1974 | Länger | 360/38 |

Primary Examiner—Robert L. Griffin
Assistant Examiner—R. John Godfrey
Attorney, Agent, or Firm—Eugene M. Whitacre; William H. Meagher

[57] ABSTRACT

In a video disc player, an FM signal recovered from the disc is subject to frequency demodulation to obtain a composite color video signal. In the composite signal, chrominance information appears in the form of a modulated subcarrier buried in spectrum troughs in the midband of a wider band luminance signal. The composite signal is applied to a modulator to develop amplitude modulated carrier waves, which serve as the "normal" signal input to a 1H delay line. Comb filter circuits respond to the delay line input and output to obtain separated chrominance and luminance signal components, which are suitably processed for delivery to color image display apparatus (e.g., color television receiver). The amplitude modulated carrier wave output of the delay line is also utilized as a "substitution" signal input to the delay line, replacing the normal signal input when a defect detector, monitoring the output of the FM demodulator, indicates the onset of a picture defect. The substitution signal path includes a network providing respectively different amounts of phase shift at the carrier frequency, and at the sideband frequency associated with the color subcarrier. In a variant of the aforesaid arrangement, switching between normal and substitution signals is effected in the video domain. A composite signal from the output of the FM demodulator is normally supplied to the amplitude modulator input, but, upon defect detection, a detected version of the amplitude modulated carrier wave output of the delay line is substituted.

16 Claims, 2 Drawing Figures

DEFECT COMPENSATION SYSTEMS

This application is a continuation-in-part of my copending application, Serial No. 476,839, filed June 6 1974, now abandoned.

The present invention relates generally to picture defect compensation systems suitable for use in color video record playback apparatus recovering composite color video signals with interleaved luminance and chrominance signal components, and particularly to such systems incorporating dual use of delay apparatus for comb filter separation of composite signal components, and for signal storage for defect masking purposes.

In the U.S. patent application of Jon. K. Clemens, Ser. No. 126,772 filed Mar. 22, 1971, now U.S. Pat. No. 3,842,194, a video disc recording/playback system is disclosed in which recorded information appears in the form of geometric variations in the bottom of a spiral groove in the surface of a disc substrate covered by a conductive coating, with a dielectric layer overlying the conductive coating. A playback stylus, including a conductive electrode affixed to an insulating support, is received in the record groove. The stylus electrode cooperates with the disc coatings to form a capacitance which varies, as the disc is rotated, in accordance with the groove bottom geometry variations passing beneath the stylus electrode. Appropriate circuitry coupled to the stylus electrode translates the capacitance variations to electrical signal variations representative of the recorded information.

In a desirable form of the above-described capacitive video disc system, the recorded information comprises a carrier frequency modulated in accordance with video signals and appears in the form of successive groove bottom depth alternations between maximum and minimum depths. In use of such a FM carrier recording format, FM detector apparatus must be employed in the player to obtain video signals from the recovered FM signal.

Illustratively, the FM detector in the player may comprise a zero-crossing detector providing an output pulse of a standard width and amplitude in response to each zero-crossing of the input signal. The zero-crossing detector output is applied to a low-pass filter having a passband substantially matching the recorded video signal bandwidth to develop the desired video signals.

In operation of a video disc player of the above-described type to recover recorded video signals for image display purposes, a problem observable in the displayed picture is the intermittent appearance in random locations of disturbances in the form of white and/or black spots and streaks supplanting the appropriate picture information. These picture defects may vary in length, thickness and persistence of appearance. While not destructive of the picture information as a whole, the intermittent appearance of such picture defects can be a source of considerable annoyance to the viewer. The present invention is concerned with compensation methods and apparatus for substantially eliminating or significantly reducing the annoying effects of such picture defects.

An analysis of the problem has revealed that a variety of different causes may lead to the production of different ones of the annoying picture spots and streaks. Some of the causes may be associated with defects in the record itself. Other causes may be associated with the conditions encountered in a particular playing of a given disc (e.g., stylus encounters with debris of various forms in various regions of the disc groove). Still other causes (e.g., scratches, dents, etc.) may be associated with the past history of use or abuse of the disc being played. Without further detailing of the causes of the picture defects, it is clear that there are myriad causes of differing types which result in the problem having a high degree of unpredictability, and varying from disc to disc, play to play, groove region to groove region, etc.

In the copending application of Jon K. Clemens, Jack S. Fuhrer and Michael D. Ross, Ser. No. 477,102, now abandoned, entitled "Defect Detection and Compensation Methods and A Apparatus" and filed concurrently with the parent hereof, a system is disclosed for effectively masking the effects of signal defects during video disc playback. In the Clemens, et al. arrangement, defect detection involves reliance upon comparison of the instantaneous level of a video signal developed from an output of the player's FM detector with preselected maximum and minimum levels. The latter levels substantially correspond to the instantaneous video signal levels produced by that FM detector in response to input signal frequencies at the FM signal deviation range limits. Pursuant to an advantageous feature of the Clemens, et al. arrangement, which enhances the ability of the defect detector to clearly and quickly recognize the onset of a defect, the input to the voltage level comparators is a wideband video signal developed in a low pass filter having a cutoff frequency well above the highest recorded video signal frequency. Voltage level excursions outside the preselected level range provide defect indications which serve to control the switched substitution of information from a preceding image line for current information. Because of the general redundancy of information in successive image lines, the substitution of the preceding line information serves to mask the defect occurrence, rendering it relatively unnoticeable to the image viewer.

In order that information concerning a preceding image line may be available as a defect-masking substitute for current line information, it is necessary that the player apparatus incorporate some suitable form of signal storage. Pursuant to the principles of the present invention, the signal storage requirements of a defect compensation system, such as that proposed in the aforementioned copending Clemens, et al. application, are realized in relatively economical fashion by an arrangement wherein the desired substitution signal information is derived from a 1H delay line present in the player in association with comb filter circuitry, serving luminance/chrominance signal separation purposes.

In the U.S. patent application of John G. Amery, et al., Ser. No. 351,036, filed Apr. 13, 1973 and entitled "Signal Translating Apparatus", now U.S. Pat. No. 3,872,497, comb filter circuit arrangements for use in video disc player apparatus are disclosed. The Amery, et al. arrangements are particularly advantageous for converting a recovered composite signal of "buried subcarrier" format (wherein chrominance information in the form of a modulated subcarrier is buried in spectrum troughs in the midband of a wider band luminance signal) to an output composite signal of a format more akin to the NTSC format. Comb filtering is employed to separate buried subcarrier chrominance signal components from midband luminance signal components.

A heterodyning step preceding comb filtering is performed in a manner substantially precluding "jitter" of played back signals from disturbing accuracy of comb filter separating action, enabling use of a single 1H delay line form for the comb filter, and enabling use of a relatively inexpensive, relatively narrowband structure for the single delay line.

In the defect compensation system approach of the present invention, a 1H delay line, serving in comb filter apparatus providing luminance/chrominance signal separation as in the above-described Amery, et al. application, serves also as a substitution signal source for defect masking purposes.

In accordance with an illustrative embodiment of the present invention, a composite color video signal, which is derived by an FM detector from an FM carrier signal recording subject to playback, is applied to a modulator to develop amplitude modulated carrier waves. Electronic switching apparatus, for controllably establishing alternative normal or defect modes of operation for the player, supplies the modulator output to the input of a 1H delay line under normal conditions. Comb filter circuits process the delay line input and output to obtain separated luminance and chrominance signal components, which are further processed for use in controlling a color image display. A defect detector, illustratively monitoring the FM detector output, provides control of the electronic switching apparatus; upon a defect appearance, the normal supply of modulator output to the delay line input is disrupted, and a substitution signal derived from the delay line output is supplied to the delay line input (in place of the modulator output). The substitution signal derivation involves differential phase shifting of the carrier wave and color subcarrier sideband components of the delay line output, to ensure effective defect masking.

In a modification of the aforesaid arrangement, pursuant to another embodiment of the present invention, the switching between normal and substitution signals occurs with the signals being at video frequencies. A composite video signal from the FM detector output is normally supplied to the amplitude modulator input, but, upon defect detection, a detected version of the amplitude modulated carrier wave output of the delay line is substituted.

Objects and advantages of the present invention will be readily recognized by those skilled in the art upon a reading of the following detailed description and an inspection of the accompanying drawing in which.

Figure 1:
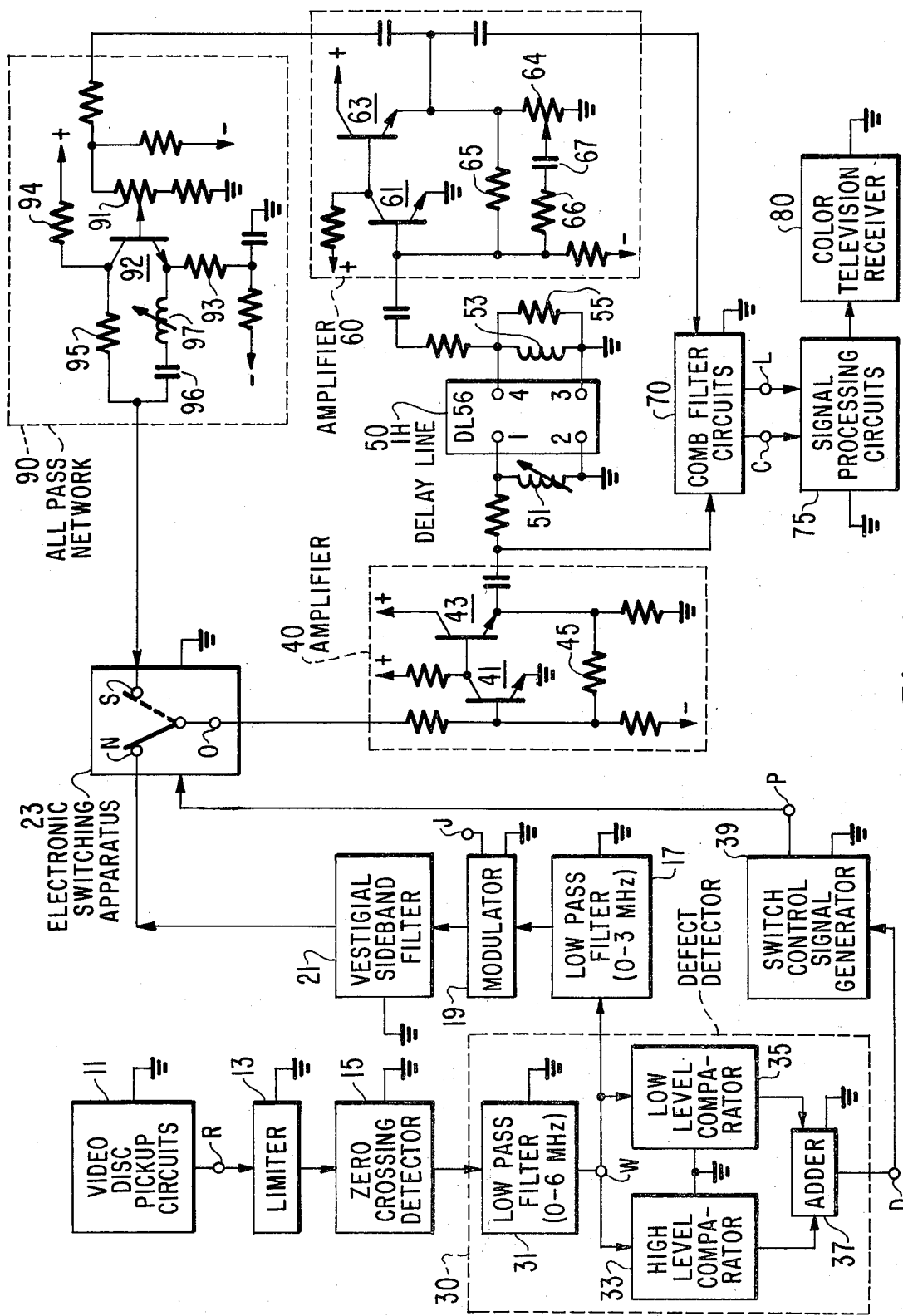
FIG. 1 illustrates, partially schematically and partially in block diagram form, video disc player apparatus incorporating a defect compensation system in accordance with the embodiment of the present invention.

In the video disc player apparatus of FIG. 1 of the drawing, an input FM signal for the player's signal processing circuits is developed at terminal R by video disc pickup circuits 11. Illustratively, the video disc pickup system is of the capacitive type previously described, and the structure and circuit arrangement of the video disc pickup circuits 11 may be generally as described in the aforementioned Clemens patent. It is assumed that the recording format for the disc to be played is such that the recovered signal information appears at terminal R as a frequency modulated carrier, the instantaneous carrier frequency deviating within fixed deviation range limits (e.g., 3.9 – 6.5 MHz.) in accordance with the amplitude of a video signal occupying a band of frequencies (e.g., 0–3.0 MHz.) below the deviation range, and representative of a succession of images to be displayed.

The input FM signal at terminal R is supplied via a limiter 13 (serving the conventional purpose of removing or reducing spurious amplitude modulation of the input FM signal) to a zero-crossing detector 15. The zero-crossing detector 15 may comprise circuits of well-known type for developing an output pulse of a fixed amplitude, width and polarity in response to each zero-crossing of the limited input FM signal. The pulse output of the zero-crossing detector 15 is supplied to an output filtering system, illustrated as comprising, in cascade, a first low pass filter 31 and a second low pass filter 17. The passband of the output lowpass filter 17 substantially matches the band (e.g., 0–3 MHz.) occupied by the recorded video signal information. The passband of the first low pass filter 31 is wider than the passband of filter 17, having a cutoff frequency (e.g., 6 MHz.) appreciably higher than the highest recorded video signal frequency. Filter 31 serves as wideband input filter for a detect detector 30 (to be subsequently described).

The zero-crossing detector 15 and its output filtering system form an FM detector of a so-called pulse counter type, providing an output in the form of a video signal corresponding to the modulation of the input FM signal. Illustratively, the video signal information recovered from the disc comprises a composite color video signal encoded in a buried subcarrier format, as disclosed in U.S. patent application, Ser. No. 350,777, filed on Apr. 13, 1973 for Dalton H. Pritchard, and now U.S. Pat. No. 3,872,498.

For purposes of illustration, the following parameters may be assumed to be descriptive of the burried subcarrier form of the recorded composite color video signal: (1) Color subcarrier frequency $(f_s') = (195/2) f_H$, or approximately 1.53 MHz., when the line frequency $(f_H)$ corresponds to the U.S. standard for color television broadcasting; (2) Chrominance signal: sum of respective quadrature related subcarrier phases respectively amplitude modulated with red and blue color difference signals (R-Y, B-Y) of 0–500 KHz. bandwidth, with equal bandwidth (500 KHz.) upper and lower sidebands preserved (and carrier suppressed); (3) Luminance signals (Y) bandwidth: 0–3 MHz.; (4) Color synchronizing component: burst of oscillations at buried subcarrier frequency $(f_s')$ of reference phase and amplitude, during horizontal blanking "backporch" (corresponding to standard NTSC color synchronizing component in all but frequency).

The composite color video signal output of filter 17 is applied to a modulator 19, which also receives carrier waves from a carrier wave input terminal J, to develop an amplitude modulated carrier wave output. The nominal frequency $f_c$ of the carrier waves at terminal J desirably corresponds to the sum of the buried subcarrier frequency $(f_s')$ and an output subcarrier frequency $(f_s)$ suitable for delivery to a color television receiver chrominance channel. Illustratively, the desired output subcarrier frequency $(f_s)$ corresponds to the NTSC value of $(455/2) f_H$, or approximately 3.58 MHz., wherefore the nominal sum frequency $(f_s)$ desired for the carrier waves at terminal J corresponds to $325 f_H$, or approximately 5.11 MHz.

Desirably, modulator 19 is of singly balanced form, balanced against the composite video input but not against the $f_c$ input from terminal J. The percentage of modulation of the carrier waves effected in modulator 19 is held to a relatively low value (e.g., 20%) by suitable relation of the input levels. As explained more fully in the aforementioned Amery, et al. application, where the disc playing conditions result in an undesired jitter of the frequencies of the recovered composite signal, the carrier waves at terminal J are desirably caused to have substantially the same jitter, so that sum and difference frequency products of the heterodyning action of modulator 19 are substantially jitter-free.

A vestigial sideband filter 21, coupled to the output of modulator 19, passes the unbalanced carrier and the lower sideband thereof. In the lower sideband (comprising the difference frequency products of modulation), the color subcarrier falls at the frequency ($f_s$) desired for output use. Desirably, the carrier frequency ($f_c$) falls at the midpoint of a high end slope of the characteristic of filter 21 so that a small portion of the upper sideband is also passed.

The output of vestigial sideband filter 21 is supplied to the normal signal input terminal N of electronic switching apparatus 21. The electronic switching apparatus 21 serves the purpose of alternatively: (1) coupling the signal appearing at the normal signal input terminal N to the switching apparatus output terminal 0; or (2) coupling the signal appearing at a substitution signal input terminal S to the switching apparatus output terminal 0. Switching between the respective normal and substitution states is effected by control signals supplied to a control signal input terminal P (from apparatus to be subsequently described).

The output signal at the switching apparatus output terminal 0 (which is, in the normal mode of player operation, the output of filter 21) is supplied to an amplifier 40, which serves as a delay line driver. Illustratively, amplifier 40 includes a grounded-emitter input stage employing transistor 41, and a grounded-collector output stage employing transistor 43, with negative feedback provided between the output transistor emitter and the input transistor base via a feedback resistor 45. Amplifier 40 provides a low impedance source for supplying signals to a 1H delay line 50 (illustratively, of the Amperex DL 56 type).

By suitable selection of the parameters of the output termination (coil 53, shunted by resistor 55) and the input termination (adjustable coil 51), the passband of the delay line 50 may be adjusted to accommodate a band of frequencies extending from slightly above $f_c$ (e.g., 5.11 MHz.) to slightly below the lowest sideband frequency $f_s - 500$ MHz. (e.g., 3.08 MHz.) of the output color subcarrier. The delay imparted by delay line 50 corresponds to a period at the line frequency ($f_H$), wherefore, under normal conditions, the signal information at the delay line output is representative of image information from an image line immediately preceding the image line for which the information at the delay line input is representative. With the indicated bandwidth for the delay line 50 encompassing the band of frequencies (e.g., 3.08 – 4.08 MHz.) shared by interleaved luminance and chrominance signal components, one may obtain, through suitable combinations of the delay line input and output, separation of the interleaved components by comb filter techniques (as outlined, for example, in the aforementioned Pritchard, and Amery, et al. patents).

For such separation purposes in the apparatus of the drawing, comb filter circuits 70 are provided. A coupling from the output of amplifier 40 supplies the delay line input to the comb filter circuits 70. The delay line output is supplied to the comb filter circuits 70 via an amplifier 60. Amplifier 60 provides sufficient signal gain to compensate for the signal attenuation introduced by delay line 50, so that the delayed signals may be delivered to the comb filter circuits at a level comparable to that of the undelayed signal input. Amplifier 60 includes a grounded-emitter input stage employing transistor 61, and a grounded-collector output stage employed transistor 63. The amplifier output appears across an emitter resistor provided by the resistive element of a potentiometer 64. A fixed amount of negative feedback, provided via a feedback resistor 65 connected between the output transistor emitter and the input transistor base, is supplemented by an adjustable amount of negative feedback provided via the series combination of resistor 66 and capacitor 67. The series combination 66, 67 is coupled between the adjustable tap of potentiometer 64 and the input transistor base; tap adjustment controls the amplifier gain for optimum level adjustment.

The comb filter circuits 70 provide a pair of outputs, at respective terminals C and L, which have been subjected, under normal conditions, to respective complementary comb filter characteristics. The output at terminal C, normally subject to a comb filter characteristic of a type having recurring peaks at odd multiples of half the line frequency and recurring nulls at multiples of the line frequency, comprises the chrominance signal component occupying a frequency shifted location ($f_s \pm 500$ MHz.) surrounding the desired output subcarrier frequency ($f_s$), and free of accompanying luminance signal components. The output at terminal L, normally subject (over the shared band) to a comb filter characteristic of a type having recurring peaks at multiples of the line frequency and recurring nulls at odd multiples of half the line frequency, comprises the luminance signal component with its midband free of the previously accompanying buried subcarrier components.

The separated components, appearing at terminals C and L are applied to signal processing circuits 75 for further processing to a form suitable for delivery to a color television receiver 80, wherein color image displays may be developed in accordance with the recorded image information. Illustratively, where signal delivery to the antenna terminals of the color television receiver is desired, the signal processing circuits may include means for recombining the separated components to form a new composite signal, which composite signal modulates a suitable RF carrier.

Thus far, the description of the apparatus of the drawing has been concerned with player operation under "normal" conditions. It is now in order to consider an altered mode of operation appropriate to the effective masking of picture defects. Recognition of the onset of a signal defect which calls for alteration of the player's operating mode is the function of the defect detector 30.

Pursuant to the defect detection principles of the previously mentioned Clemens, et al, application, defect detector 30 incorporates as an input filter the wideband (e.g., 0–6 MHz.) low pass filter 31 which receives the pulse output of zero-crossing detector 15. Filtering of the output pulses of detector 15 by the defect detector input filter 31 develops a signal, the instantaneous amplitude of which is substantially linearly proportional to the instantaneous frequency of the limited signal input to the zero-crossing detector 15. Instantaneous detector input frequency variations between $f_{max}$ and $f_{min}$ (the deviation range limits of the recorded FM signal) will result in variations in the instantaneous amplitude of the filter output between substantially fixed voltage limits ($V_{max}$ and $V_{min}$). Should the instantaneous frequency of the input to detector 15 shift above $f_{max}$, however, the instantaneous amplitude of the output of filter 31 will rise above $V_{max}$; conversely, should the instantaneous frequency of the detector input fall below $f_{min}$, the instantaneous amplitude of the filter output will drop below $V_{min}$.

Voltage level comparators 33 and 35, coupled to the output of filter 31, serve to identify those occasions when the instantaneous amplitude of the output of filter 31 departs from the $V_{max}$ to $V_{min}$ range. High level comparator 33 provides a defect indication at its output for the duration of each excursion of the filter 31 output amplitude above a first comparison voltage level set in the immediate vicinity of $V_{max}$. Low level comparator 35 provides a defect indication of similar character at its output for the duration of each excursion of the filter 31 output amplitude below a second comparison voltage level set in the immediate vicinity of $V_{min}$. It is generally desirable to set said first and second comparison voltage levels slightly above $V_{max}$, and slightly below $V_{min}$, respectively, to ensure that actual extremes of the desired picture information do not result in defect indication (particularly in the face of the possibility of slight errors in the playback disc rotation speed that may slightly alter the effective deviation range of the desired signal). Inclusion of such a tolerance in the comparison level settings does not significantly detract from the accuracy of defect detection, since the troublesome defects sought to be detected typically involve a substantial departure in frequency from the $f_{max}$ to $f_{min}$ range. Adder 37 combines the outputs of both comparators 33, 35 to provide a single defect indication pulse output at terminal D indicating in common the departures in either direction from the $f_{max}$ to $f_{min}$ range.

The wideband response of filter 31 enables its output to closely follow the abrupt onset of a signal defect. That is, upon the occurrence of a signal defect, the excursion of the filter output past a comparison threshold may be effected with a short rise time, enabling an early initiation of a defect indication pulse. With an appropriately rapid response provided for the associated compensation controlling device (e.g., electronic switching apparatus 23), the player can be shifted to a compensation mode of operation before the output of the (slower response) narrow band, output signal filter 17 has been significantly disturbed by the signal defect.

The wideband response of filter 31 also enables its output to closely follow a return of the input signal frequency to a within-range value, wherefore the termination of a defect indication pulse output of a comparator may precede the end of the related disturbance in the output of the slowerresponse filter 17. This could result in a premature return of the player to its normal operating mode, were the defect indication pulse output of adder 37 to be used, per se, as the control signal for switching apparatus 23. To avoid premature terminations of defect compensation, it is desirable to provide some means of effectively "stretching" the defect indication pulses to a termination time following the end of the related disturbance in the output of filter 17.

A switch control signal generator 39, responsive to thhe defect indication pulses at terminal D, performs the desired "stretching" function in developing signals for controlling the switching state of the electronic switching apparatus 23. Reference may be made to the copending application of A. L. Baker, Ser. No. 477,103, entitled "Signal Switching Apparatus" and concurrently filed with the parent hereof, and now U.S. Pat. No. 3,909,518, for a detailed description of suitable apparatus for performing the function of switch control signal generator 39. The Baker arrangement includes an envelope detector for the defect indication pulses, a resistive load for the detector providing a chosen discharge time constant for the detector capacitor, and a comparator referencing the detector output against a selected threshold voltage.

Switching waveforms, developed by generator 39 for appropriately stretched intervals upon detection of a signal defect by detector 30, are applied to the control input terminal P of switching apparatus 23 to shift the player to a defect mode of operation in which the normal signal path between terminals N and O is disrupted and a substitution signal path between terminals S and O is activated. Reference may be made to the aforesaid copending Baker application for a description of switching circuitry particularly advantageous for performing the function of switching apparatus 23. In the Baker switching arrangement, the respective normal and substitution signal paths involve no signal phase inversion; such a characteristic should be assumed for the signal paths in switching apparatus 23 herein.

Pursuant to the principles of the present invention, amplitude modulated carrier waves, derived from the output of the same delay line 50 that provides delayed signals for the operation of comb filter circuits 70, serve as the substitution signal supplied to terminal S of switching apparatus 23.

The substitution signal derivation is performed by an all pass network 90, having its input coupled to the output of amplifier 60 and having its output coupled to switch terminal S. The all pass network 90 includes a transistor 92 disposed in a phase splitter configuration, with outputs of opposing polarity developed across an emitter resistor 93 and a collector resistor 94. The respective outputs are combined in a network formed by a resistor 95 connected between the transistor collector and terminal S, and by the series combination of a capacitor 96 and an inductor 97 connected between the transistor emitter and terminal S. An input signal voltage divider includes a potentiometer 91 having an adjustable tap connected to the base of transistor 92. The adjustable input tap provides a facility for optimum adjustment of the substitution signal level for effective defect masking.

Desirably, the parameters of the all pass network 90 are chosen so as to provide substantially equal gain at all frequencies within the band of frequencies (e.g., approximately 3.08 – 5.11 MHz.) passed by delay line 50, while providing a phase characteristic with a differential of substantially 180° between the respective phase shifts introduced at the respective frequencies $f_c$ and $f_s$. In the illustrative circuit arrangement of the drawing, the desired phase shift in network 90 at the output subcarrier frequency ($f_s$) is substantially 0°, while the desired phase shift in network 90 at the carrier frequency ($f_c$) is substantially 180°. With provision of such respective phase shifts, a transition between current line information appearance and preceding line information appearance at switch output terminal O (as will ensue upon switching to the defect mode of operation) occurs with phase continuity for the $f_c$ carrier component, as well as phase continuity for the $f_s$ color subcarrier component (assuming information redundancy in succeeding image lines).

Moreover, the indicated phase shifts for subcarrier frequency components result in a net phase shift of 180° at the output subcarrier frequency for a recirculating signal passing from the output of amplifier 60 through circuits 90, 23, and 40 to the delay line input. One is thereby assured that during the defect mode of operation (when the information at both the input and the output of the delay line represents the same image line) the following result is obtained: Components at the color subcarrier frequency can appear at the chrominance signal output terminal C of the comb filter circuits 70, whereas components at the buried subcarrier frequency will be rejected from the signal at the luminance output terminal L.

In explanation of the foregoing, it should first be noted that the particular terminal connections shown in the drawing for the illustrative DL 56 delay line involve choice of an inverted output mode of signal recovery from the delay line 50. In this mode, a signal component at a frequency which is an odd multiple of half the line frequency (such as the subcarrier frequency) and which continues, through successive lines, will appear during normal operations with the same phase at both input and output of the delay line. Because of the net phase reversal introduced by amplifier 60, such a signal will appear at the output of amplifier 60 in anti-phasal relation to the signal appearance at the delay line input. Where the two inputs (delay line input, and amplifier 60 output) to the comb filter circuits 70 are in such anti-phasal relation, signal passage to terminal C is effected and signal passage to terminal L is blocked. Conversely, where the two inputs (delay line input, and amplifier 60 output) to the comb filter circuits are in co-phasal relation, signal passage to terminal C is blocked, and signal passage to terminal L is effected. In the defect mode of operation, where the amplifier 60 output is recirculated to the delay line input, the aforementioned net phase reversal at the subcarrier frequency in the 90-23-40 path establishes the anti-phasal relation for the comb filter inputs that results in subcarrier component passage to terminal C and blockage from terminal L, as desired.

It may be noted that the substitution signal derived from the output of amplifier 60 will have a bandwidth (e.g., approximately 3.06–5.11 MHz.) narrower than the normal signal bandwidth (e.g., approximately 2.11 – 5.11 MHz.), due to the bandwidth limitations of the illustrative DL 56 delay line. The resultant luminance signal component will thus be missing certain high frequency components (e.g., above 2 MHz.), and will additionally be subject to a rejection notch at the buried subcarrier frequency (e.g., 1.53 MHz.). The resultant chrominance signal component will not be combed free of interleaved luminance components. Despite these noted drawbacks, the substitution effected during defects in practice of the present invention involves sufficient information of appropriate character to providde quite effective masking of the troublesome picture defects. Moreover, such a desirable result is obtained with relatively little expenditure for the substitution signal source beyond that already required for other (comb filtering) purposes.

It should also be noted that the economical substitution signal source provided by the present invention may be used in association with a variety of forms of defect detector, although the illustrated association with a defect detector 30 of the aforementioned Clemens, et al. type provides a particularly advantageous compensation system. In the illustrated association, the narrowband video signal output filter 17 is shown as receiving the output of zero-crossing detector 15 via the defect detector input filter 31. It may be appreciated that in an acceptable modification, the filter 17 may directly receive the detector 15 output. However, the illustrated arrangement, with filters 31 and 17 in tandem, is believed to be preferable in easing the switching speed requirements imposed on apparatus 39 and 23. A greater delay in completing the switching to the defect mode subsequent to defect indication pulse initiation is tolerable in the tandem arrangement, since the delay associated with filter 31 is common to the video output signal and switching signal channels in that arrangement.

Figure 2:
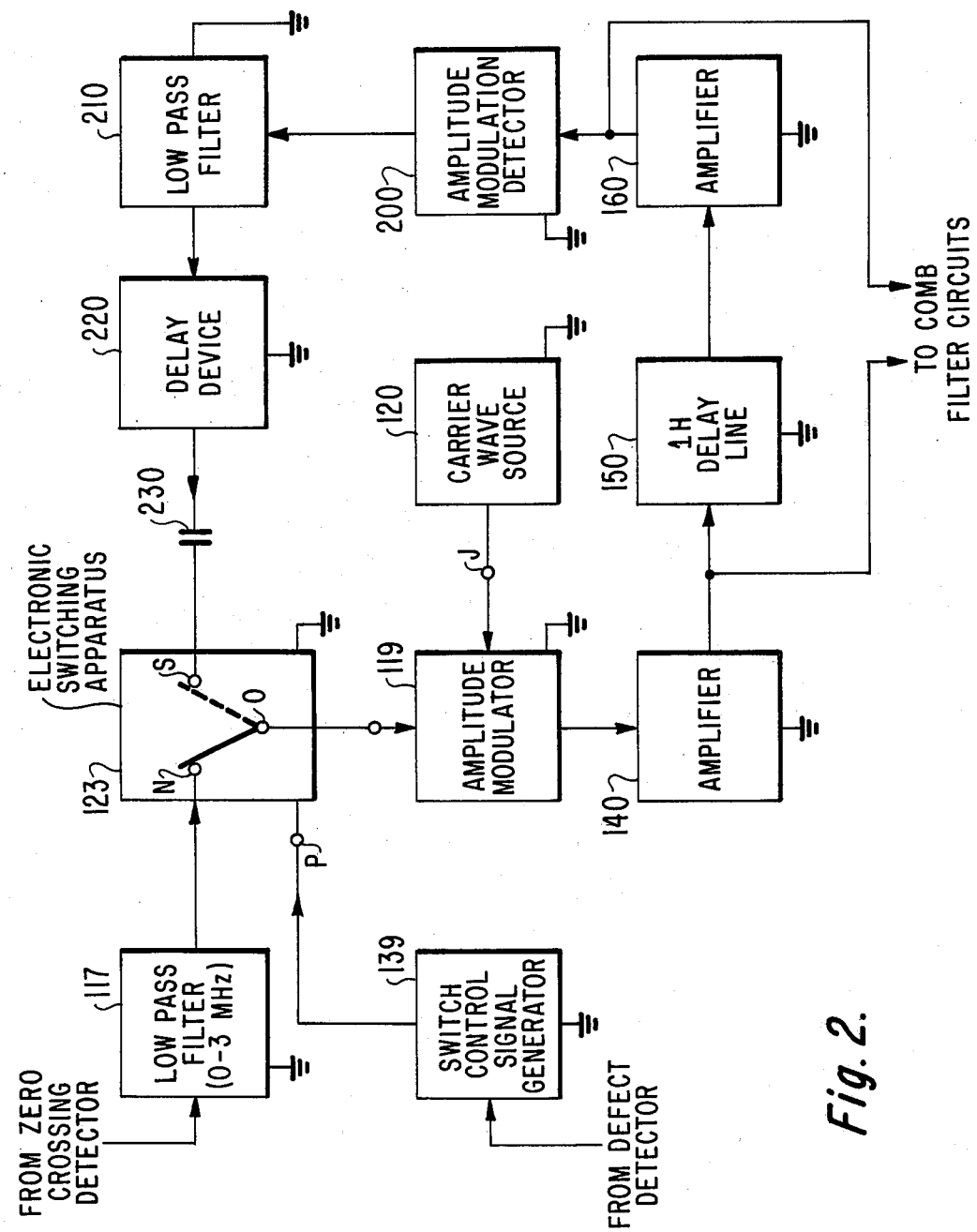
FIG. 2 illustrates, in block diagram form, a modification of the FIG. 1 arrangement, pursuant to a further embodiment of the present invention.

FIG. 2 illustrates a modification of the previously described FIG. 1 arrangement, the modification involving the use of switching between normal and "substitution" signals in video signal form. The FIG. 2 arrangement includes electronic switching apparatus 123, which may be similar in form to the electronic switching apparatus discussed in connection with FIG. 1, and which serves the purpose of alternatively: (1) completing a signal path between a normal signal input terminal N and the switching apparatus output terminal O, or (2) completing a signal path between a substitution signal input terminal S and the output terminal O. Switching between the respective normal and substitution states is effected by control signals supplied to a control signal input terminal P from a switch control signal generator 139. The control signal generator 139 may be, illustratively, of the form described in the aforementioned Baker application, responding to the output of a defect detector (e.g., such as the defect detector 30 of the FIG. 1 arrangement herein) to provide an appropriately timed switching waveform for shifting the video disc player to a defect masking mode of operation wherein the normal signal path between terminals N and O is disrupted and a substitution signal path between terminals S and O is activated.

The output terminal O of switching apparatus 123 is connected to the modulating signal input terminal M of an amplitude modulator 119, also having a carrier wave input terminal J coupled to the output of a carrier wave source 120, with the output of modulator 119 comprising carrier waves from source 120 modulated in amplitude in accordance with the signals delivered to the modulating signal input terminal M by the switching apparatus 123. The nominal frequency $f_c$ of the carrier waves supplied by source 120 to terminal J corresponds as in FIG. 1, to the sum of the buried subcarrier frequency ($f_s'$) and the desired output subcarrier frequency ($f_s$), and illustratively corresponds to 325 $f_H$, or approximately 5.11 MHz. Desirably, the frequency of the carrier waves developed by source 120 varies about the aforesaid nominal frequency in consonance with the jitter of the frequencies of the composite video signal recovered during record playback. For this purpose, carrier wave source 120 may be assumed to be suitably controlled, as, for example, by phase locked loop circuitry of the form disclosed in the previously mentioned Amery, et al. patent.

The output of modulator 119 is applied to an amplifier 140, which serves to drive a 1H delay line 150. The output of delay line 150 is applied to an output amplifier 160. Illustratively, elements 140, 150 and 160 may be of the specific form discussed above for the corresponding elements 50, 60 and 70 of the FIG. 1 arrangement. The delay line input signal (e.g., available at the output of driving amplifier 140) and the delay line output signal (e.g., available at the output of output amplifier 160) are supplied to suitable comb filter circuitry (not shown in FIG. 2) to achieve desired luminance/chrominance signal separation, as previously described in connection with FIG. 1. For an illustration of one specific form such comb filter circuitry may advantageously take, reference may be made to my copending application, Ser. No. 506,446, filed Sept. 16, 1974, and now U.S. Pat. No. 3938179.

In contrast to the FIG. 1 arrangement, as previously noted, the respective inputs to the switching apparatus 123 are in composite video signal form. The normal input signal (i.e., the signal applied to terminal N, and thus conveyed to the modulating signal input terminal M during the normal mode of operation of the player) is the output of the player's FM detector, derived in the FIG. 2 arrangement from a low pass filter 117 (e.g., having a 0–3 MHz. passband) responsive to the output of a zero crossing detector (such as detector 15 of the FIG. 1 arrangement). The substitution input signal (i.e., the signal applied to terminal S, and thus conveyed to the modulating signal input terminal M during the defect masking, or substitution, mode of operation of the player) is a delayed composite video signal derived from the output of delay line 150.

To obtain the substitution signal, the output of the delay line output amplifier is applied to an amplitude modulation detector 200 which recovers a composite video signal from the amplitude modulated carrier wave output of the delay line. The output of the detector 200 is supplied to the switching apparatus input terminal S via a signal path which includes, in cascade, (1) a low pass filter 210, having a cutoff frequency chosen so as to block passage of carrier and sideband components in the output of detector 200; (2) a delay device 220 (e.g., of the coaxial type conventionally employed for luminance delay purposes in color television receivers) providing, in summation with the small amount of delay imparted by filter 210, a signal delay of a time duration substantially corresponding to a half-period at the buried subcarrier frequency $f_s'$ and (3) a DC blocking coupling element, such as the illustrated capacitor 230.

The provision of the aforesaid half-period delay ensures that during the defect masking mode, components at the output color subcarrier frequency can properly appear in the chrominance signal output of the player's comb filter circuits, whereas components at the buried subcarrier frequency can be rejected from the luminance signal output thereof. The effect achieved has been previously explained in connection with the FIG. 1 arrangement.

It has been found desirable to block the passage to terminal S of the DC component (and long term variations thereof) of the output of detector 200 to avoid errors in the brightness level of substituted material that may tend to defeat the defect masking goal. To appreciate the nature of the problem involved, it is appropriate to consider certain practical aspects of use of glass delay lines of the relatively inexpensive type exemplified by the DL56 line illustrated in FIG. 1. One obtains at the output of such a delay line not only a main component corresponding to a delay line input signal after a single traversal (1t) of the delay line, but also, superimposed thereon, further components, such as one corresponding to a delay line input signal after three traversals (3t) of the delay line. While typically these further components are appreciably smaller than the main component, the net effect of their presence is to cause departure of the delay line's frequency response characteristic from a desired flatness over its passband to a rippled shape (with the spacing between adjacent ripple peaks illustratively corresponding to half the line frequency $f_H$). When carrier waves modulated in amplitude in accordance with a composite video signal are passed through such a delay line, the magnitude of the carrier wave component passed by the delay line will be dependent upon the precise location of the carrier frequency with respect to the peaks of the rippled frequency response characteristic of that delay line. Upon detection of the modulated carrier wave output of the delay line output, the magnitude of the DC component of the recovered composite video signal will accordingly be dependent upon such precise location.

In the video disc player environment of the described apparatus, where variations of the average turntable speed (to the extent tolerated) cause long term variatons of the average value of the buried subcarrier frequency of the composite video signal recovered during playback, and where association of the carrier wave source 120 with the phase locked loop system for output subcarrier stabilization purposes (as described in the aforesaid Amery, et al. patent) can impose comparable variations on the average frequency value of the carrier waves applied to modulator 119, one is confronted with the likelihood of spurious long term variations of the carrier frequency location, relative to the ripple peaks of the line's response characteristic, to an extent that may have a significant impact on the magnitude of the DC component of detected versions of the delay line output.

It has been found that the defect masking effect of a substitution signal, derived from the output of a delay line of the aforementioned type, is significantly improved, in circumstances of economical player tolerances, when the DC component of the detected delay line output and its spurious long term variations are suppressed in the substitution signal path, as by the interposition of coupling capacitor 230. AC coupling in the substitution signal path in the FIG. 1 arrangement cannot provide a comparable spurious component suppression effect, since the delayed signal fed to the switching apparatus 23 is in modulated carrier form. Where the average turntable speed is especially tightly held, as, for example, with use of a speed control system of a crystal controlled oscillator reference type, such as shown in the copending U.S. patent application, Ser. No. 559,098, of James C. Schopp, filed Mar. 17, 1975, the spurious DC component variation range can be sufficiently small as to readily permit achievement of proper defect masking by the FIG. 1 arrangement. However, where looser tolerances are accepted with respect to average turntable speed, as, for example, with use of an economical speed control system of a power line frequency reference type, such as shown in the copending U.S. patent application, Ser. No. 504,486, of J. Hammond, et al., filed Sept. 10, 1974, and now U.S. Pat. No. 3912283, the FIG. 2 arrangement appears preferable.

What is claimed is:

1. In a system for playback of a record of successive color images, said system including pickup means for recovering from said record an FM signal having an instantaneous frequency subject to variations over a given deviation range in accordance with the amplitude of a color image representative composite video signal of given bandwidth; and frequency modulation detecting means coupled to said pickup means for deriving from said FM signal a composite signal including (a) a signal component representative of the chrominance of a color image and occupying only a given frequency band, and (b) a signal component representative of the luminance of said color image and including a first luminance signal portion occupying said given frequency band and an additional luminance signal portion having frequencies outside said given frequency band; said first luminance signal portion including signal components normally subject to occupancy of only a first plurality of regularly spaced spectral locations extending over said given frequency band, and said chrominance signal including signal components normally subject to occupancy of only a second plurality of spectral locations interleaved with said first plurality; the combination comprising:

a source of carrier waves;
means for modulating the amplitude of said carrier waves in accordance with a composite signal output of said frequency modulation detecting means;
a delay line providing between its input and output a signal delay of a time duration substantially corresponding to a period at the line frequency of said image representative video signals;
means for normally applying the modulated carrier wave output of said modulating means to the input of said delay line;
comb filter means coupled to both the input and output of said delay line for separating said chrominance and luminance signal components under normal conditions of FM signal recovery by said pickup means;
means for deriving a substitution signal from the output of said delay line;
means responsive to the output of said pickup means for sensing abnormal conditions of FM signal recovery by said pickup means; and
switching means responsive to the output of said sensing means for disabling said modulated carrier wave output applying means and concomitantly activating the application of said substitution signal to said delay line input when the onset of said abnormal conditions is sensed by said sensing means.

2. Apparatus in accordance with claim 1 wherein said chrominance signal component comprises a modulated color subcarrier signal occupying a band of frequencies surrounding a first color subcarrier frequency; wherein the modulated carrier wave output of said modulating means includes a carrier component at the frequency of said carrier waves and a chrominance sideband component occupying a band of frequencies surrounding a second color subcarrier frequency shifted from said first color subcarrier frequency; and wherein said substitution signal deriving means includes a network providing respective phase shifts at said carrier wave frequency and said second color subcarrier frequency which differ by approximately 180°.

3. Apparatus in accordance with claim 1 wherein said frequency modulation detecting means includes a wideband low pass filter supplying a wideband signal output to the input of a narrow band low pass filter, with said composite signal being derived from the output of said narrow band low pass filter; wherein the bandwidth of said wideband low pass filter exceeds said given bandwidth; wherein the bandwidth of said narrow band low pass filter substantially matches said given bandwidth; and wherein said wideband signal output of said wideband low pass filter is supplied to said sensing means.

4. In a system for playback of a record of successive color images, said system including means for deriving during said record playback a color image representative composite video signal including a luminance signal, and a modulated color subcarrier forming a chrominance signal having frequencies interleaved with the frequencies of a portion of said luminance signal; the combination comprising:

a 1H delay line having an input and an output;
a source of carrier waves;
an amplitude modulator responsive to said carrier waves and said composite video signal;
comb filter means coupled to both the input and output of said delay line for separating said luminance and chrominance signals;
means for utilizing the outputs of said comb filter means to control a display of said color images;
switching means for completing a first signal path between said modulator and said delay line input when in a first switching state, and for completing a second signal path between said delay line output and said delay line input when in a second switching state; and
means responsive to the condition of operation of said composite signal deriving means for controlling the switching state of said switching means.

5. Apparatus in accordance with claim 4 wherein the output of said modulator includes a carrier component at the frequency of said carrier, and a color subcarrier component at a shifted color subcarrier frequency outside the band of frequencies occupied by the chrominance signal included in the output of said deriving means; and wherein said second signal path includes means providing respectively different phase shifts at said carrier frequency and said shifted color subcarrier frequency.

6. In a system for playback of a record of successive color images, said system including pickup means for recovering from said record an FM signal having an instantaneous frequency subject to variations over a given deviation range in accordance with the amplitude of a color image representative composite video signal of given bandwidth; and frequency modulation detecting means coupled to said pickup means for deriving from said FM signal a composite signal including (a) a signal component representative of the chrominance of a color image and occupying only a given frequency band, and (b) a signal component representative of the luminance of said color image and including a first luminance signal portion occupying said given frequency band and an additional luminance signal portion having frequencies outside said given frequency band; said first luminance signal portion including signal components normally subject to occupancy of only a first plurality of regularly spaced spectral locations extending over said given frequency band, and said chrominance signal including signal components normally subject to occupancy of only a second plurality of spectral locations interleaved with said first plurality; the combination comprising:

a delay line providing between its input and output a signal delay of a time duration substantially corresponding to a period at the line frequency of said image representative video signals;

means for supplying modulated carrier waves to the input of said delay line, said modulated carrier wave supplying means being normally subject to operation in a first mode;

said modulated carrier wave supplying means, in said first mode of operation, serving to deliver to the input of said delay line carrier waves modulated in amplitude in accordance with composite video signal information which corresponds to the composite video signal information concurrently appearing at the output of said frequency modulation detecting means;

comb filter means coupled to both the input and output of said delay line for separating said chrominance and luminance signal components under normal conditions of FM signal recovery by said pickup means;

means responsive to the output of said pickup means for sensing abnormal conditions of FM signal recovery by said picking means; and means responsive to the output of said sensing means for altering the mode of operation of said modulated carrier wave supplying means from said first mode to a second mode, when the onset of said abnormal conditions is sensed by sensing means;

said modulated carrier wave supplying means, in said second mode of operation, serving to deliver to the input of said delay line carrier waves modulated in amplitude in accordance with composite video signal information which substantially corresponds to the composite video signal information concurrently appearing at the output of said delay line.

7. Apparatus in accordance with claim 6 wherein said modulated carrier wave supplying means includes:

a source of carrier waves;

means for modulating the amplitude of the carrier waves from said source in accordance with a composite video signal output of said frequency modulation detecting means; and switching means for completing a first signal path between the outputs of said modulating means and said delay line input when in a first switching state, and for completing a second signal path between the output of said delay line and said delay line input when in a second switching state;

said switching means being in said first switching state for said first mode of operation of said modulated carrier wave supplying means, and in said second switching state for said second mode of operation thereof.

8. Apparatus in accordance with claim 6 wherein said modulated carrier wave supplying means includes:

amplitude modulation detecting means for recovering a composite video signal from modulated carrier waves appearing at the output of said delay line;

a source of carrier waves;

means for modulating the amplitude of carrier waves from said source in accordance with signals appearing at a modulating signal input terminal;

means for applying the output of said amplitude modulating means to the input of said delay line;

switching means for completing a first signal path between an output of said frequency modulation detecting means and said modulating signal input terminal when in a first switching state, and for completing a second signal path between an output of said amplitude modulation detecting means and said modulating signal input terminal when in a second switching state;

said switching means being in said first switching state for said first mode of operation of said modulated carrier wave supplying means, and in said second switching state for said second mode of operation thereof.

9. Apparatus in accordance with claim 8 wherein said second signal path includes means for precluding passage of any DC component of the output of said amplitude modulation detecting means to said modulating signal input terminal.

10. Apparatus in accordance with claim 9 wherein said chrominance signal component derived by said frequency modulation detecting means comprises modulated color subcarrier waves, and wherein said second signal path includes delay means providing a signal delay of a time duration substantially corresponding to a half period at the nominal subcarrier frequency of said modulated color subcarrier waves.

11. In a system for playback of a record of successive color images, said system including means for deriving during said record playback a color image representative composite video signal including a luminance signal, and a modulated color subcarrier forming a chrominance signal having frequencies interleaved with the frequencies of a portion of said luminance signal; the combination comprising:

a 1H delay line having an input and an output;

means for supplying amplitude modulated carrier waves to the input of said delay line, said modulated carrier wave supplying means being normally responsive to an output of said signal deriving means;

means for utilizing said delay line to effect comb filter separation of said luminance and chrominance signals under normal conditions of operation of said composite signal deriving means; and means responsive to abnormal conditions of operation of said composite signal deriving means for altering the mode of operation of said modulated carrier wave supplying means such that said modulated carrier wave supplying means is rendered responsive to the output of said delay line to the exclusion of said output of said composite signal deriving means.

12. Apparatus in accordance with claim 11 wherein said modulated carrier wave supplying means includes:

a source of carrier waves;

means for modulating the amplitude of carrier waves from said source in accordance with said output of said signal deriving means; and switching means for completing a first signal path between said modulating means and said delay line input when in a first switching state, and for completing a second signal path between the output of said delay line and said delay line input when in a second switching state;

said switching means being in said first switching state for the normal mode of operation of said modulated carrier wave supplying means, and in said second switching state for the altered mode of operation of said modulated carrier wave supplying means established by said mode altering means.

13. Apparatus in accordance with claim 11 wherein said modulated carrier wave supplying means includes:

amplitude modulation detecting means coupled to the output of said delay line;

means for delaying the output of said amplitude modulation detecting means for a time interval substantially corresponding to a half period at the nominal subcarrier frequency of the modulated color subcarrier provided by said composite signal deriving means;

a source of carrier waves;

means for modulating the amplitude of carrier waves from said source in accordance with signals appearing at a modulating signal input terminal;

means for applying the output of said amplitude modulating means to the input of said delay line;

switching means for completing a first signal path between said output of said composite signal deriving means and said modulating signal input terminal when in a first switching state, and for completing a second signal path between an output of said delaying means and said modulating signal input terminal when in said second switching state;

said switching means being in said first switching state for the normal mode of operation of said modulated carrier wave supplying means, and in said second switching state for the altered mode of operation effected by said mode altering means.

14. Apparatus in accordance with claim 13 also including means for blocking the passage of any DC component of the output of said amplitude modulation detecting means to said modulating signal input terminal when said switching means is in said second switching state.

15. In a system for playback of a record of successive color images, said system including means for deriving during said record playback a color image representative composite video signal including a luminance signal, and a modulated color subcarrier forming a chrominance signal having frequencies interleaved with the frequencies of a portion of said luminance signal; the combination comprising:

a source of carrier waves;

an amplitude modulator responsive to said carrier waves and to a composite video signal input;

a 1H delay line having an input coupled to the output of said amplitude modulator;

comb filter means coupled to both the input and output of said delay line for separating luminance and chrominance signals;

means for utilizing the outputs of said comb filter means to control a display of said color images;

an amplitude modulation detector coupled to the output of said delay line for developing a delayed composite video signal;

switching means for supplying the composite video signal derived by said deriving means as said composite video signal input to said modulator when in a first switching state, and for supplying the delayed composite video signal developed by said detector as said composite video signal input to said modulator when in a second switching state; and means responsive to the condition of operation of said composite signal deriving means for controlling the switching state of said switching means.

16. Apparatus in accordance with claims 15 wherein said switching means, when in said second switching state, supplies AC components of said delayed composite video signal, to the exclusion of any DC component thereof, as said composite video signal input to said modulator.

* * * * *